Jan. 18, 1938. H. J. SCHOLTZE 2,105,702
FLEXIBLE SHAFT COUPLING
Filed Aug. 6, 1934
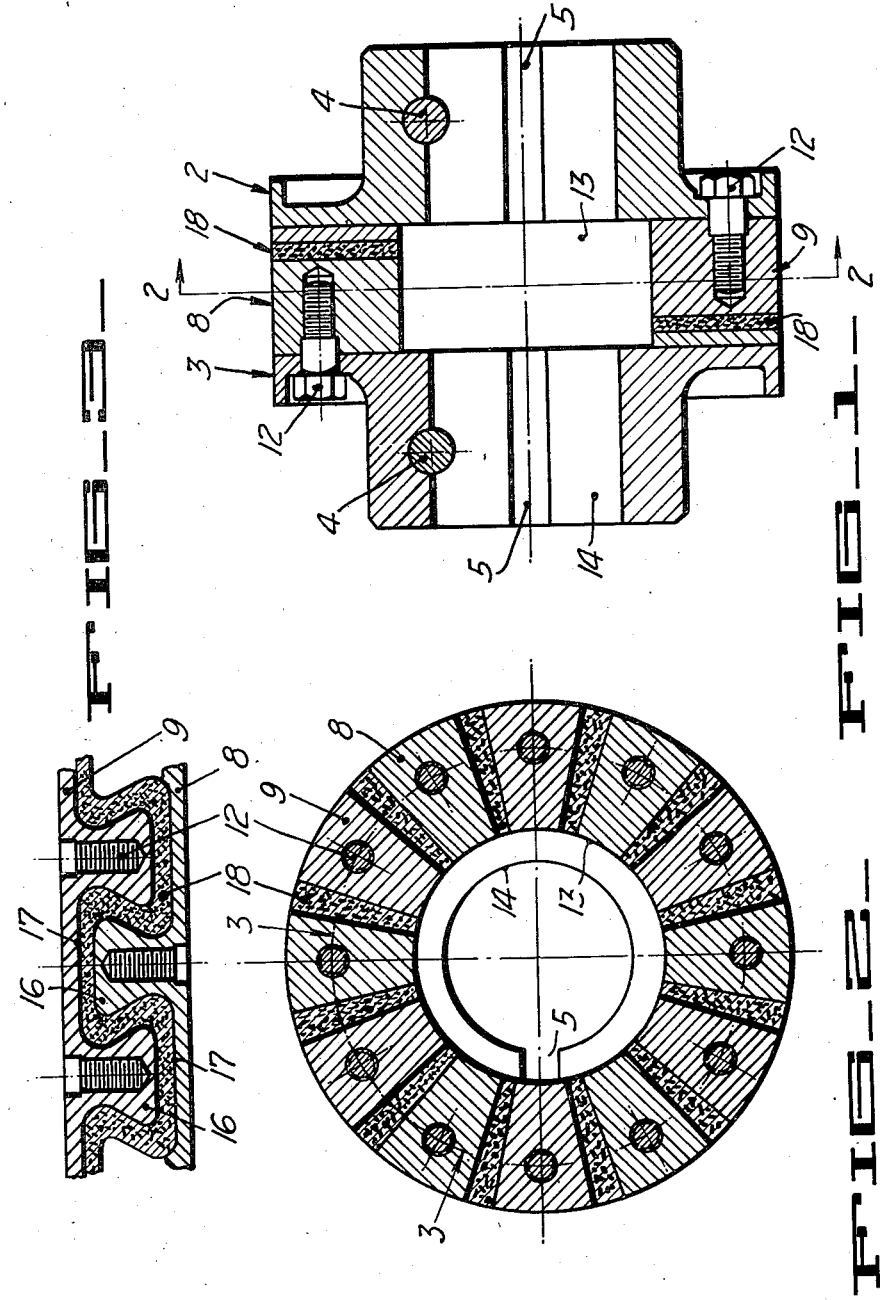
INVENTOR.
HERMAN J. SCHOLTZE.
BY
*Joseph B. Gardner*
ATTORNEY Patented Jan. 18, 1938

2,105,702

UNITED STATES PATENT OFFICE 2,105,702

FLEXIBLE SHAFT COUPLING

Herman J. Scholtze, Berkeley, Calif.

Application August 6, 1934, Serial No. 738,594

3 Claims. (Cl. 64—14)

The invention relates to a means of coupling together a pair of shafts so as to permit cooperation notwithstanding misalignment or variation in positional relationship of the shafts.

An object of the invention is to provide a coupling means of the character described which is effective not only for compensating for various types of misalignment of the shafts, but will effectively withstand axial and torsional strains in all directions.

Another object of the invention is to provide a coupling of the character described which is effective for absorbing relatively heavy strains as aforesaid, yet at the same time will possess and maintain over a long period of use a maximum flexibility and cushioning quality.

A further object of the invention is to provide a coupling of the character described which is extremely simple in construction, may be easily installed or disconnected, will afford use almost indefinitely without requiring a replacement of parts, and insures an even distribution over the entire coupling of the various strains to which the coupling may be subjected.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of the coupling.

Figure 2 is a transverse sectional view of the coupling taken on the line 2—2 of Figure 1.

Figure 3 is a fragmentary sectional view of the coupling taken on the curved line 3—3 of Figure 2.

In the embodiment of the invention illustrated in the drawing, the coupling is incorporated with a set of coupling flanges 2 and 3 arranged to receive and be secured to the ends of the shafts to be coupled together. The mode of attachment of the coupling flanges with the shafts will of course vary in accordance with the function and mode of operation of the shafts, but as here shown the attachment is arranged to be effected through means including bolts 4 and keyways 5 provided on the flanges and by which the latter may be fixed to the shafts against axial and rotative displacement.

Arranged for positioning between the flanges are a pair of like coupling members 8 and 9 here shown in the form of rings or discs and designed to be attached to the flanges 2 and 3 respectively by means of screws 12. The central opening 13 of the discs is preferably of greater diameter than the openings 14 of the flanges so that should the shaft ends extend beyond the inner faces of the flanges they will not interfere with the discs.

Means are provided on the adjacent faces of the discs for effecting with the assistance of a layer or lining of flexible material interposed therebetween, an interlocking of the discs, both as against axial and rotative displacement with respect to one another, yet affording against a gradually increasing resilient resistance a certain amount of said displacement, either axial, rotative or both, as the nature of the operation of the shafts necessitate. As here shown said means comprises coacting male and female elements provided on said faces and arranged to engage one with the other, the male elements being in the form of projections 16 while the female elements are in the form of recesses 17. Each disc has a plurality of the projections and recesses, and moreover the projections and recesses are designed to extend radially of the discs with the width of the elements increasing as the diameter of the discs grow larger. Preferably the elements are so designed that adjacent projections define the intervening recess thereby permitting the inclusion of a maximum number of elements of given size for the discs.

As will be clear from Figure 3, each projection, in respect to its area circumferentially of the disc, is formed of dove-tail shape, that is of increasing width from the base to the outer extremity, and conversely each recess is formed of correspondingly decreasing width from the closed to the open side. Since the projections are in the present embodiment formed as fixed parts of the discs, in order that the projections of the one disc may enter the recesses of the other disc, the widest portion of each projection is somewhat less than the narrowest portion of the recess arranged to be engaged thereby.

Arranged for positioning between the discs is a liner or layer 18 of a flexible material preferably of a nonmetallic fibrous nature, and as will be most clear from Figures 2 and 3, the liner is of the same length as the projections and designed to extend completely around the coupling members so as to form a continuous spacer between the adjacent surfaces of the projections and recesses while the projections and recesses are operatively interengaged. Preferably the liner is of such thickness that when the projections and recesses are operatively engaged as aforesaid, an even spacing will be provided between the different adjacent surfaces. Insertion of the liner into position between the discs, is best effected after the discs have been brought together with the projections inserted in the recesses, the liner being then slipped edgewise along the periphery of the discs into the space between the opposing surfaces of the projections and recesses. If desired the layer 18 may be in the form of a filler of rubber composition or the like, placed into the space aforesaid and vulcanized therein.

It will now be clear that once the members have been assembled with the liner contained between the opposing surfaces of the projections and recesses, axial separation of the members will be resiliently resisted as effectively as will be the axial compression thereof. Likewise, the same resistance will be set up against rotative displacement of the one member relative to the other in one direction as well as in the other, the resistance being smooth and even at all times, but increasingly rigid as the forces applied to the coupling become greater. It should also be noted that since the portions of the members coacting for assuming the stresses, are located completely around the discs, a most effective distribution of the strains on the coupling will result.

A further feature of importance of the invention is the readiness with which the coupling may be installed or taken down. Thus to apply the same, it is merely necessary to insert the assembled discs with the liner, between the flanges and then by means of the screws 12 secure the parts together. In this connection it may be noted that ordinarily neither of the shafts will protrude from the flanges to thereby interfere with the members. To remove the coupling members it is merely necessary to release the screws 12 and slip the members transversely from between the flanges. Or, should it be merely desirable to disconnect the coupling without removing same, it is only necessary to remove the screws from but one of the members.

I claim:

1. A coupling of the character described comprising a pair of annular members having on opposed sides thereof dovetail extended and recessed portions nested within the other, and a continuous liner of flexible material interposed between said portions said dovetailed extended portions and recessed portions having comparatively flat tops and bottoms respectively, the distance across the tops of the dovetailed portions defining the maximum width of the dovetailed portions and being substantially the same as the distance between the tops of adjacent dovetailed portions which comprises the minimum width of the dovetailed receptacles.

2. A coupling of the character described comprising a pair of axially aligned members having on opposed adjacent sides thereof extended and recessed portions, the extended portion having sides inclined outwardly axially of the connected member and the recessed portion having sides inclined inwardly axially of the connected member and arranged for a dovetail connection with said first sides, and a continuous liner of flexible material interposed between said sides and locking the members against axial separation, the maximum dimensions of width of said extended portions being substantially the same as the minimum dimension of width of the recessed portions.

3. A coupling of the character described comprising a pair of annular axially aligned members having on adjacent sides thereof alternate extended and recessed portions, the extended portions of each member being inserted in but spaced from the sides of the recessed portions of the other member, and a filler of flexible material in the space between the interengaged portions, said extended portions being enlarged at points spaced from their inner ends and said recess portions being substantially correspondingly reduced at points spaced from their inner ends the greatest width of each enlargement of each extended portion being substantially the same as the smallest width of said recessed portions, whereby the members will be locked together against separation when the filler is operatively disposed in the space between the portions.

HERMAN J. SCHOLTZE.